United States Patent
Nakajima (10) Patent No.: US 9,178,313 B2
(45) Date of Patent: Nov. 3, 2015

(54) ELECTRIC VEHICLE CHARGING PORT CONTROL DEVICE

(71) Applicant: Nissan Motor Co., Ltd., Yokohama-shi, Kanagawa (JP)

(72) Inventor: Tsuyoshi Nakajima, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/374,704

(22) PCT Filed: Feb. 21, 2013

(86) PCT No.: PCT/JP2013/054357
§ 371 (c)(1),
(2) Date: Jul. 25, 2014

(87) PCT Pub. No.: WO2013/133037
PCT Pub. Date: Sep. 12, 2013

(65) Prior Publication Data
US 2015/0037994 A1    Feb. 5, 2015

(30) Foreign Application Priority Data
Mar. 9, 2012  (JP) ................................. 2012-053813

(51) Int. Cl.
| H01R 13/62 | (2006.01) |
| H01R 13/639 | (2006.01) |
| H01R 13/631 | (2006.01) |
| H01R 13/627 | (2006.01) |
| B60L 11/18 | (2006.01) |

(52) U.S. Cl.
CPC ........ *H01R 13/6397* (2013.01); *B60L 11/1824* (2013.01); *H01R 13/631* (2013.01); *B60L 11/1818* (2013.01); *H01R 13/6275* (2013.01); *Y02T 10/7005* (2013.01); *Y02T 90/14* (2013.01)

(58) Field of Classification Search
CPC ....................... H01R 13/6397; H01R 13/62933
USPC ........................................ 439/304, 310, 133
See application file for complete search history.

(56) References Cited

U.S. PATENT DOCUMENTS

| 8,075,329 | B1 * | 12/2011 | Janarthanam et al. ........ 439/304 |
| 8,251,734 | B2 * | 8/2012 | Katagiri et al. ............... 439/352 |
| 8,357,001 | B2 * | 1/2013 | Katagiri et al. ............... 439/304 |
| 8,376,767 | B2 * | 2/2013 | Kahara et al. ................. 439/304 |
| 8,376,768 | B2 * | 2/2013 | Kurumizawa et al. ........ 439/304 |
| 8,698,349 | B2 * | 4/2014 | Kurumizawa et al. ....... 307/10.1 |
| 8,753,136 | B2 * | 6/2014 | Hirashita et al. .............. 439/304 |

(Continued)

FOREIGN PATENT DOCUMENTS

| JP | 2010-264847 A | 11/2010 |
| JP | 2011-238530 A | 11/2011 |
| WO | 2011000776 A1 | 1/2011 |

*Primary Examiner* — Hae Moon Hyeon
(74) *Attorney, Agent, or Firm* — Global IP Counselors, LLP (57) ABSTRACT

An electric vehicle charging port control device yields a locked state in which disengagement between an active-engagement part of a charging connector and a passive-engagement part of a charging port is restricted by a restricting member and an unlocked state in which disengagement is permitted. The restricting member is moved to in front of a predetermined position for yielding the locked state or the unlocked state by being energizingly driven by a motor. Before the active-engagement part and the passive-engagement part are engaged, the restricting member is moved in a locking direction, and subsequently in an unlocking direction.

6 Claims, 8 Drawing Sheets

(56) References Cited

U.S. PATENT DOCUMENTS

| | | |
|---|---|---|
| 2011/0281452 A1 | 11/2011 | Kurumizawa et al. |
| 2014/0235086 A1* | 8/2014 | Nakajima ............... 439/347 |
| 2014/0235087 A1* | 8/2014 | Nakajima ............... 439/347 |
| 2014/0235089 A1* | 8/2014 | Nakajima ............... 439/350 |
| 2014/0300319 A1* | 10/2014 | Nakajima ............... 320/109 |
| 2014/0300320 A1* | 10/2014 | Nakajima ............... 320/109 |
| 2015/0035478 A1* | 2/2015 | Uchiyama et al. ...... 320/107 |

\* cited by examiner

Figure 1:
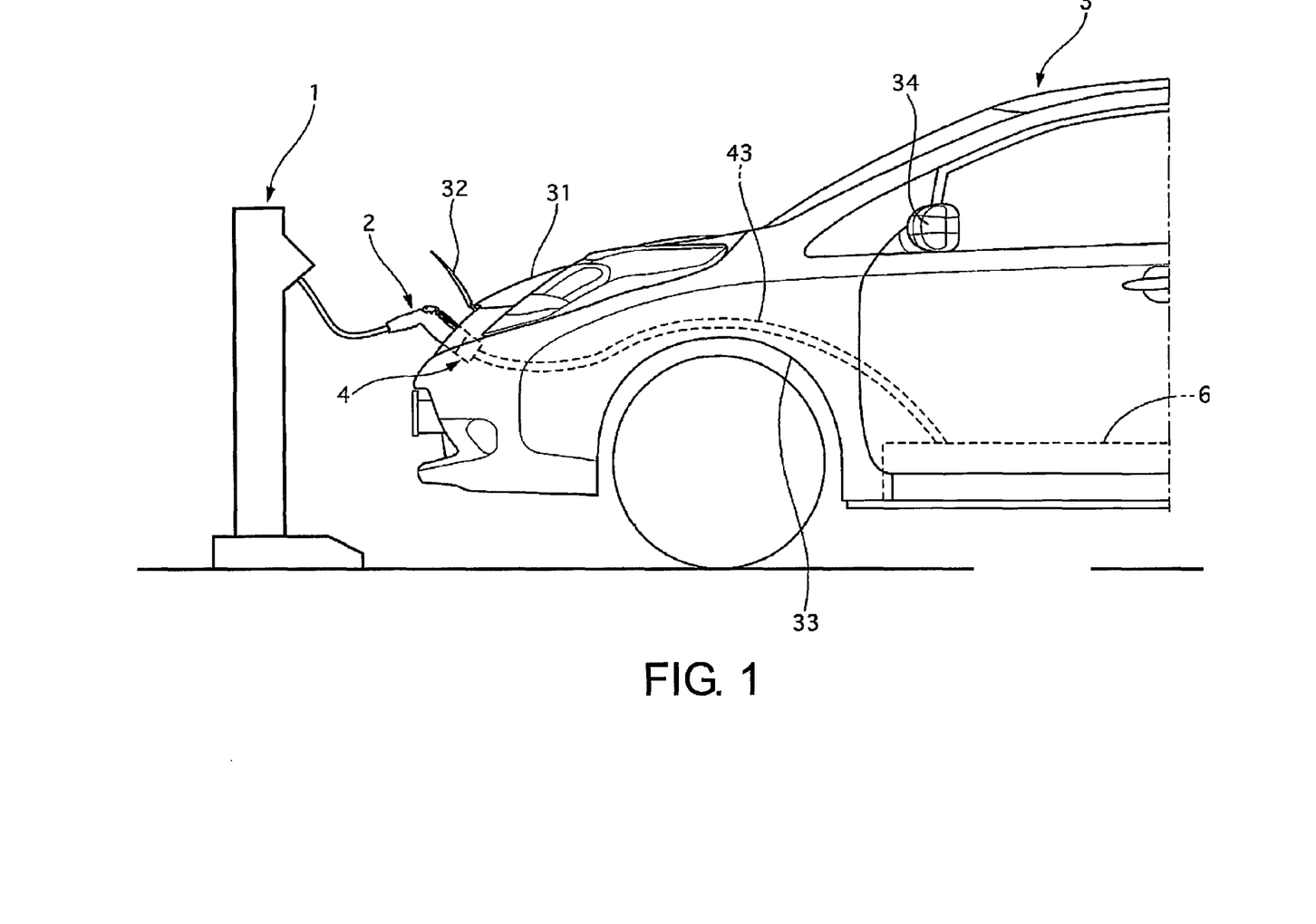
FIG. 1 is a schematic view of a vehicle provided with an electric vehicle charging port control device according to a first embodiment being charged.

FIG. 14 ically connected to an onboard battery 6 installed on the floor of a vehicle 3 by a cable 43 is provided at the front of a vehicle 3 to the front of a hood 31. The charging port 4 is provided at a position at roughly the same height as the upper end of a wheel well 33 and lower than a side mirror 34, and is closed by a charging lid 32 when the vehicle is not being charged. The charging station 1 is provided with a charging connector 2 for supplying power, and, when charging the vehicle, the charging lid 32 is opened and the charging connector 2 is inserted into the charging port 4, thereby charging the vehicle.
ELECTRIC VEHICLE CHARGING PORT CONTROL DEVICE

CROSS-REFERENCE TO RELATED APPLICATIONS

This application is a U.S. National stage application of International Application No. PCT/JP2013/054357, filed Feb. 21, 2013, which claims priority to Japanese Patent Application No. 2012-053813 filed in Japan on Mar. 9, 2012, the contents of each of which are hereby incorporated herein by reference.

BACKGROUND

1. Field of the Invention

The present invention relates to an electric vehicle charging port control device for charging a battery installed in a vehicle.

2. Background Information

Unexamined Japanese Patent Application Publication No. 2010-264847 discloses a technology related to an electric vehicle charging port control device. This Patent Application Publication discloses a charging connector for connecting a charging port of an electric vehicle and a charging station constituting a power supply means, the connector comprising a link 41 provided so as to rotate freely in tandem with the operation of a button by an operator, and being configured so that the charging connector and a charging inlet 11 are not disconnected during charging thanks to an engaging projection 34 provided within the charging inlet 11. A configuration provided with a sliding lock bar (a "locking mechanism") that prevents the link 41 from rotating in order to prevent the charging cable from being disconnected and stolen during charging is also disclosed.

SUMMARY

In cases in which the locking mechanism described above is actuated by a motor, a configuration in which the motor and the lock bar are constantly linked will place an excessive burden upon the motor or linkage mechanism, leading to problems in durability.

The present invention was conceived in view of the problems described above, and has an object of providing an electric vehicle charging port control device that is capable of preventing inadvertent disconnections between a charging port and a charging connector during charging and has superior durability.

In order to achieve the object proposed above, the electric vehicle charging port control device according to the present invention yields a locked state in which disengagement between an active-engagement part of a charging connector and an passive-engagement part of a charging port is restricted by a restricting member and an unlocked state in which such disengagement is permitted. The restricting member is moved to in front of a predetermined position for yielding the locked state or the unlocked state by being energizingly driven by the motor. Before the active-engagement part and the passive-engagement part engage, the restricting member is moved in a locking direction, and subsequently in an unlocking direction.

As a result, the restricting member is not operated over its entire range of actuation by the motor, making it possible to keep excessive loads from acting upon the restricting means and improve durability. In addition, the restricting member can be returned to an initial position suitable for an unlocked position.

BRIEF DESCRIPTION OF THE DRAWINGS

Referring now to the attached drawings which form a part of this original disclosure.

DETAILED DESCRIPTION OF EMBODIMENTS

Embodiment 1

FIG. 1 is a schematic view of a vehicle provided with an electric vehicle charging port control device according to a first embodiment being charged. A charging port 4 electri- The vehicle according to the first embodiment is provided with both a rapid charging port for use when connecting to a rapid charger and a normal charging port for use when charging using household power or the like. The description of the first embodiment will focus on the normal charging port. This is because charging using the rapid charging port requires a comparatively short amount of time, and rarely involves the vehicle being left charging for extended periods. It goes without saying that the rapid charging port may also be provided with a locking mechanism.

Figure 2:
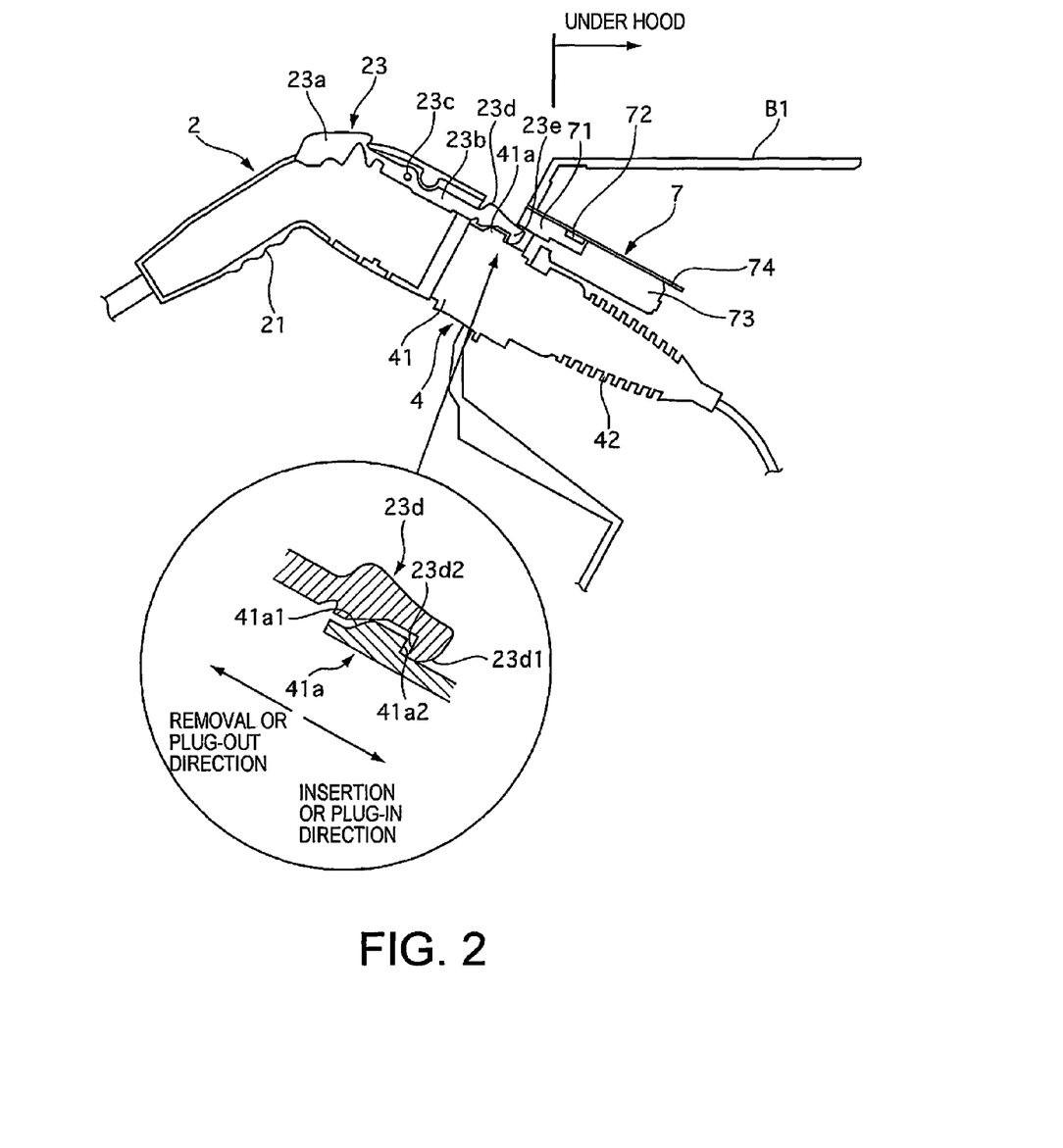
FIG. 2 is a schematic cross-sectional view of a charging connector and a charging port according to the first embodiment in a connected state.

FIG. 2 is a schematic cross-sectional view of a charging connector and a charging port according to the first embodiment in a connected state. The charging port 4 comprises an inserted member 41 that is anchored to a body piece B1 on a side of the vehicle by a bracket 74, a cable 43 connected to the inserted member 41 on the inside of the vehicle frame, and a tube 42 covering a connecting section of the cable 43. A raised part 41a (passive-engagement part) is formed on the outer circumference of the inserted member 41, and an insertion hole into which an inserted section (not shown) can only be inserted at predetermined relative positions is formed on an inner circumference of the inserted member 41.

The charging connector 2 is a standardized type in wide general use, with a standardized shape and size, and is connected by a user to the charging port 4 of the vehicle. The charging connector 2 comprises a grip section 21 gripped by a user, the inserted section, which is inserted into the charging port 4 on the vehicle, and an active-engagement member 23 capable of being engaged with and disengaged from the charging port 4 by a user. When the charging connector 2 is connected to the charging port 4, the active-engagement member 23 engages with the raised part 41a provided on the charging port 4, thereby restricting movement in the direction in which the charging connector 2 is removed from the charging port 4.

The active-engagement member 23 rotates about a support point 23c anchored to a case member of the charging connector 2. The active-engagement member 23 is biased by an elastic member not shown in the drawing so that a release button 23a is positioned above as seen in FIG. 2 (i.e., so that a hook part 23d is positioned below in FIG. 2). A release button 23a that a user can press while gripping the grip section 21 is present on an end nearer the grip section 21. Meanwhile, the raised part 41a and the engaging hook part 23d are present on an end nearer the inserted section. The hook part 23d has a keylike hook shape comprising a curved surface section 23d1 comprising a smooth curved surface having an end part that is smooth with respect to the insertion direction and a stepped section 23d2 that is sharp with respect to the removal direction. Meanwhile, a sloped surface 41a1 is formed on an end of the raised part 41a facing the outside of the vehicle frame, and an engaging surface 41a2 that is roughly perpendicular to the removal direction is formed on an end facing the inside of the vehicle frame, forming an anisotropic raised shape.

When the charging connector 2 is inserted into the charging port 4, the curved surface section 23d1 on the end part of the hook part 23d passes over the sloped surface of the raised part 41a without having to particularly operate the release button 23a. Subsequently, when the stepped section 23d2 passes the engaging surface 41a2, the hook part 23d is pushed downward by an elastic member not shown in the drawings, and the hook part 23d and the raised part 41a engage. The charging connector 2 may also be inserted while the release button 23a is pressed. The engagement of the stepped section 23d2 and the engaging surface 41a2 thus restricts movement in the removal direction if a user pulls the charging connector 2 in the removal direction without operating the release button 23a. To release this engagement, the release button 23a is pressed to rotate the active-engagement member 23 around the support point 23c, and the hook part 23d is moved above the engaging surface 41a2 to release engagement.

Figure 3:
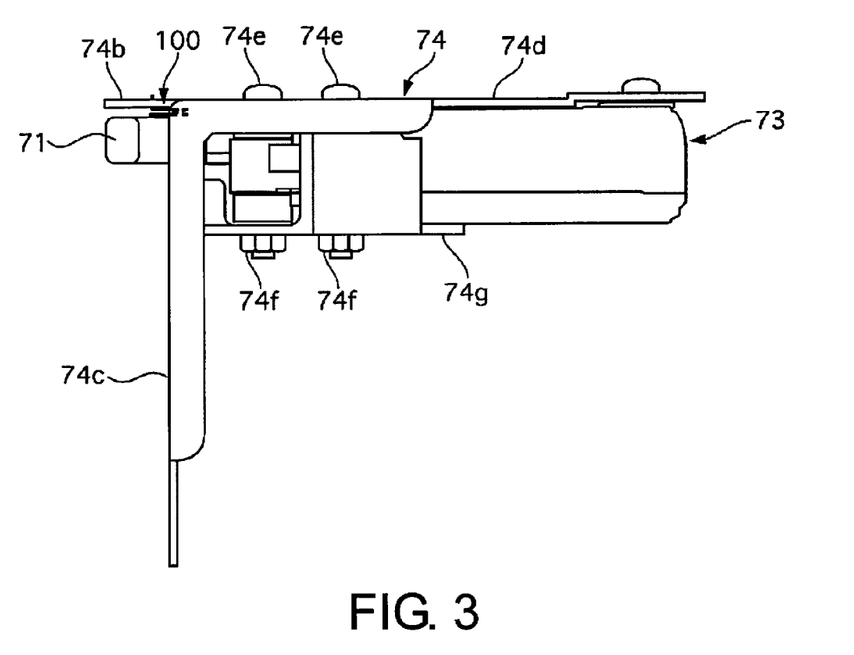
FIG. 3 is a side view showing the configuration of a locking mechanism according to the first embodiment.
Figure 4:
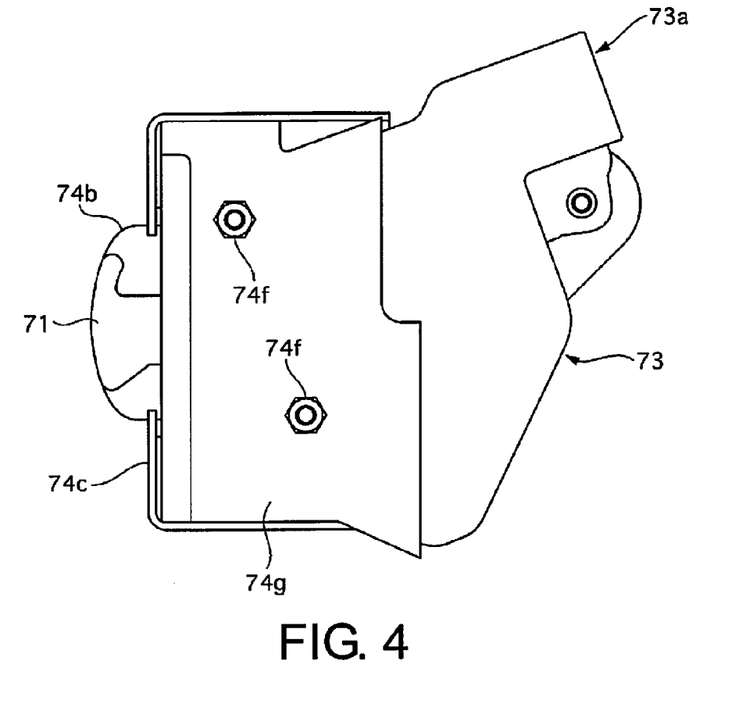
FIG. 4 is an underside view showing the configuration of a locking mechanism according to the first embodiment.

FIG. 3 is a side view showing the configuration of a locking mechanism according to the first embodiment, and FIG. 4 is an underside view of the configuration of the locking mechanism according to the first embodiment.

A locking mechanism 7 that restricts the rotation of the active-engagement member 23 is provided above the charging port 4. The locking mechanism 7 comprises a swing arm 71 that yields a state in which separation is restricted (a "locked state") due to the hook part 23d being positioned in a direction moving away from the raised part 41a and a state in which separation is not restricted (an "unlocked state") due to the hook part 23d not being positioned in said direction, a lock actuator 73 that actuates the swing arm 71, and a bracket 74 for anchoring and supporting the lock actuator 73 and the inserted member 41 of the charging port 4.

As shown in the side view in FIG. 3 and the underside view in FIG. 4, the bracket 74 comprises an upper surface section 74d to which the lock actuator 73 is anchored and supported by a bolt 74e, a support extension 74b extending from the upper surface section 74d so as to cover the range of motion of the swing arm 71, a side surface section 74c that is bent roughly perpendicularly with respect to the upper surface section 74d and to which the inserted member 41 and the like are attached by a bolt, and a cover member 74g that is attached to a side facing the upper surface section 74d with the lock actuator 73 being sandwiched therebetween. The upper surface section 74d, the lock actuator 73, and the cover member 74g are assembled into a whole using a plurality of bolts 74e and nuts 74f. A failure forced operation opening 74a allowing an anchoring screw 72 (to be described hereafter) to be operated is formed in the upper surface section 74d (see FIGS. 2 and 7); a user can open the hood and rotate the bolt using a screwdriver or the like. The reasons for this will be described later. A toggle spring 100 for assisting the operation of the swing arm 71 is provided between the support extension 74b and the swing arm 71. The toggle spring 100 imparts torque from a position before the position at which the swing arm 71 enters the locked state in the direction of the position at which the locked state is entered. Torque is similarly imparted from a position before the position at which the swing arm 71 enters the unlocked state in the direction of the position at which the unlocked state is entered. The toggle spring 100 will be described in detail hereafter.

Figure 5:
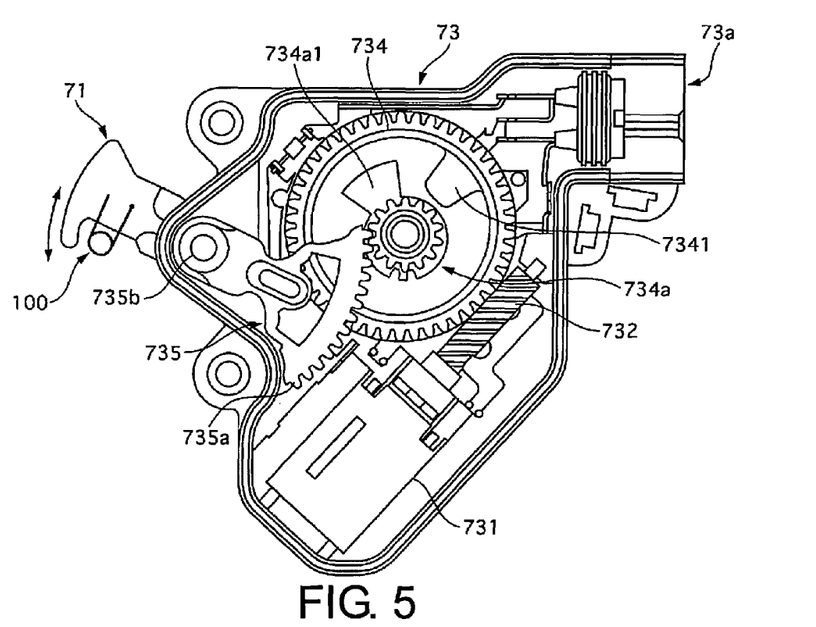
FIG. 5 is an internal structure illustration showing the mechanical configuration of the locking mechanism according to the first embodiment.

FIG. 5 is an internal structure illustration showing the mechanical configuration of the locking mechanism according to the first embodiment. The lock actuator 73 comprises a connector section 73a for connecting an external power source and a controller not shown in the drawings, a motor 731 that rotationally drives according to a command signal, a worm 732 that rotates integrally with a rotor of the motor 731, a worm wheel 734 that rotates enmeshed with the worm 732, a drive gear 734a that has a smaller diameter than the worm wheel 734 and the same rotary shaft as the worm wheel 734 and rotates relative to the worm wheel 734, and a driven member 735 that meshes with the drive gear 734a and has a toothed surface on its outer circumference. A partially raised engaging section 7341 is provided on a surface of the worm wheel 734, and a roughly fan-shaped passive-engagement part 734a1 is formed. When the worm wheel 734 rotates, the raised engaging section 7341 also rotates. If the raised engaging section 7341 and the passive-engagement part 734a1 are not engaged at this time, the drive gear 734a will not rotate.

When the raised engaging section 7341 and the passive-engagement part 734a1 engage, the drive gear 734a begins to rotate. This operates takes place in a similar fashion regardless of whether the worm wheel 734 rotates clockwise or counterclockwise as seen in FIG. 5.

In the first embodiment, the swing arm 71 is rotated to a position before the position at which the locked state or the unlocked state is entered by torque from the motor 731, after which the swing arm 71 is rotated by torque from the toggle spring 100 until reaching the position at which the locked state or the unlocked state is reached. At this time, the driven member 735 is further rotated by torque from the toggle spring 100. Because the passive-engagement part 734a1, which is actuated integrally with the driven member 735 is rotated in a direction away from the raised engaging section 7341 of the worm wheel 734, which is actuated integrally with the motor 731, the movement of the motor 731 does not affect this rotation. By virtue of such an arrangement, the swing arm 71 can easily be manually rotated to release the lock even if a malfunction occurs in the motor 731, making rotational driving impossible. The relationship thereof with the toggle spring 100 will be described hereafter.

The driven member 735 comprises a meshing section 735a that is formed roughly in a fan shape and has a toothed surface on its outer circumference, and a rotary shaft section 735b incorporated so as to be integral with the swing arm 71. The swing arm 71 is a member that moves about the rotary shaft section 735b as an axis of rotation; in other words, its axis of rotation is different from the plugging/unplugging direction of the charging connector 2 and different from the direction of the axis of rotation of the active-engagement member 23. In the locking mechanism according to the first embodiment, the swing arm 71 only needs to move within a predetermined angular range; thus, using the driven member 735 having a partially toothed surface ensures torque even if the motor 731 is small. The lock actuator 73 is also of a type that is generally used in vehicle automatic door locking mechanisms; these parts can be repurposed without modification in order to decrease manufacturing costs.

Figure 6:
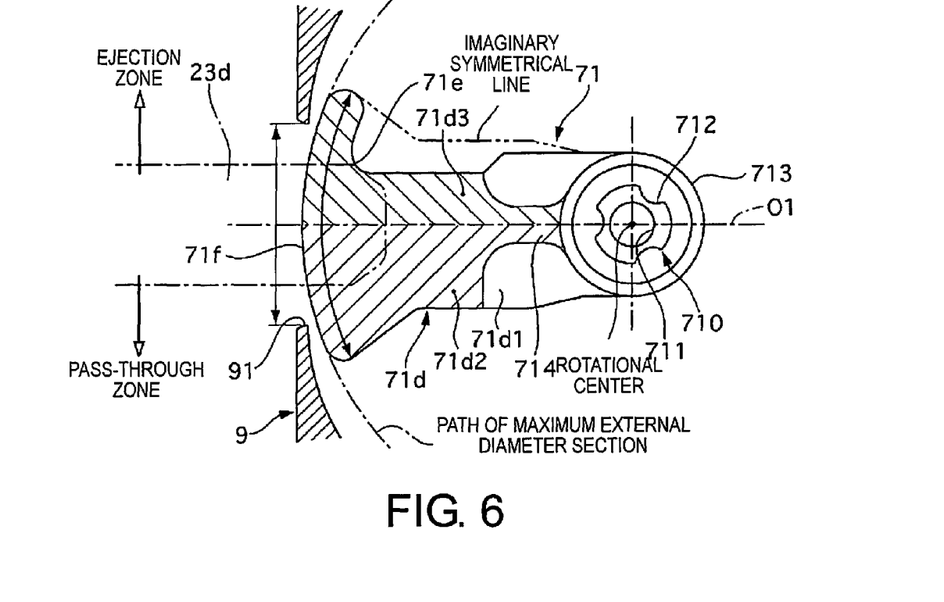
FIG. 6 is top surface view showing the configuration of a swing arm of the locking mechanism according to the first embodiment.

FIG. 6 is top surface view showing the configuration of a swing arm of the locking mechanism according to the first embodiment. The swing arm 71 comprises an attachment section 710 that attaches to the rotary shaft section 735b of the lock actuator 73 so as not to rotate relatively, and a cylindrical wall 713 that covers the outer circumference of the attachment section 710. Concave parts 712 are formed at three locations on the circumference of the attachment section 710, and relative movement in a rotational direction is restricted by raised parts formed on the rotary shaft section 735b fitting into the concave parts 712. A through-hole 711 is formed in the center of the attachment section 710, and the anchoring screw 72 for integrally anchoring the swing arm 71 and the rotary shaft section 735b passes therethrough. Because the through-hole 711 allows the upper part of the swing arm 71 and the side nearer the lock actuator 73 to communicate, if the movement of the swing arm 71 is impeded due to freezing or the like and hot water is poured thereon to counter the freezing, the hole also functions as a flow path through which the hot water can flow, allowing the freezing to be countered more rapidly. The anchoring screw 72 is screwed in place by a female screw part provided on the side facing the rotary shaft section 735b, causing the rotary shaft section 735b and the swing arm 71 to move integrally.

The direction in which the anchoring screw 72 is tightened is the same direction in which the swing arm 71 rotates to release the lock. This is to allow the anchoring screw 72 to be tightened to rotate the swing arm 71 in the release direction even if the lock actuator 73 fails and lock release is completely impossible.

Figure 7:
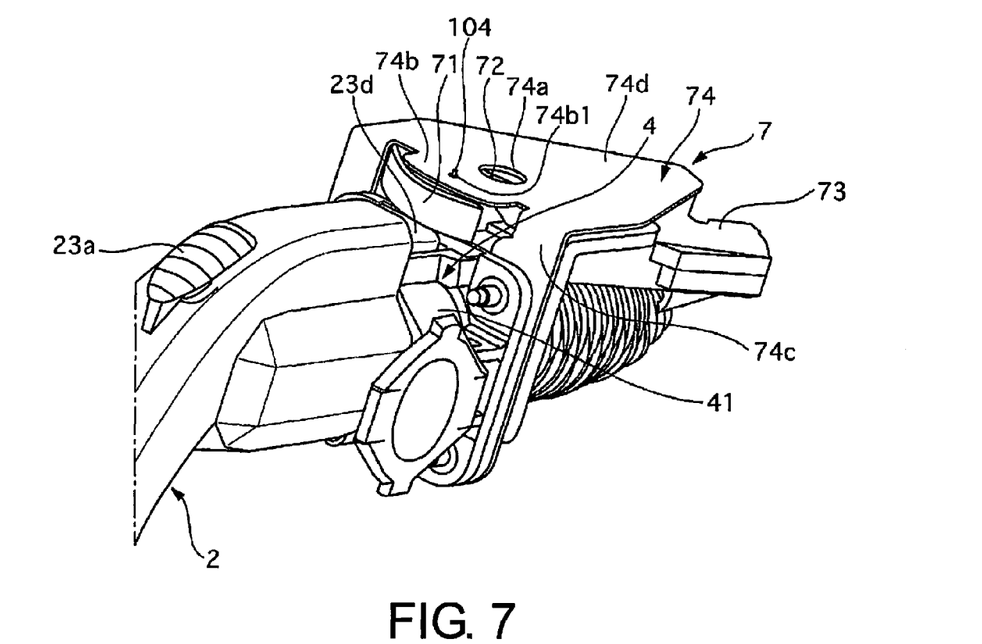
FIG. 7 is a schematic perspective view of the charging connector and the charging port according to the first embodiment in a connected state.

FIG. 7 is a schematic perspective view of the charging connector and the charging port according to the first embodiment in a connected state. To describe in greater detail with reference to FIGS. 7 and 2, the anchoring screw 72 is provided within the failure forced operation opening 74a so as to be exposed within the hood. Ordinarily, a hood release lever within the vehicle is operated to open the hood. The anchoring screw 72 is located in a position allowing for easy access if the release lever can be operated; in other words, in a position that cannot be accessed even if the charging lid 32 is opened. This arrangement ensures that other individuals not having access to the vehicle interior cannot operate the anchoring screw 72. The anchoring screw 72 is designed to be easily operable using a Phillips head screwdriver forming part of an onboard toolkit or the like, allowing the user to release the screw.

A plate-like arm member 71d extends from the cylindrical wall 713 to the left in FIG. 6. The end of the arm member 71d spreads outward in a fan shape, and is designed so as to overlap the hook part 23d as viewed from above (equivalent to being positioned in the moving-away direction of the active-engagement member). A hollowed-out section 71d1 for reducing weight and a rib 714 for ensuring the necessary strength are formed on the arm member 71d.

The swing arm 71 is molded from plastic, and, as shown in FIG. 6, has a vertically asymmetrical shape as viewed from above. In the following description, a vertically symmetrical imaginary line will be drawn with a dotted line using an axis O1 connecting the rotational center of the swing arm 71 (i.e., the point where the center of the swing arm with respect to the thickness direction and the axis of rotation thereof meet) and the rotational center of the active-engagement member 23 when in a locked state (i.e., the point where the center of the active-engagement member 23 with respect to the widthwise direction and the axis of rotation thereof meet) as a top-down view reference line, and the relationship of the reference line with the imaginary symmetrical line will be described. The zone below the axis O1 is one into which the swing arm 71 ejects when the locking mechanism transitions from a restricting state to an unrestricting state. As such, the area below the axis O1 will be defined as the "ejection zone", and the area above the axis O1 as the "pass-through zone."

If the swing arm 71 is symmetrical in the ejection zone and the pass-through zone, the area to the ejection zone side of the hook part 23d will be more filled in. This leads to the following problems. Specifically, the relatively low position of the charging port 4 on the vehicle means that slush or mud kicked up by another vehicle passing nearby could splatter onto the charging port 4. If charging is performed in an extremely cold environment, such splattered slush or mud could freeze, forming icicle-like obstructions hanging from the arm member 71d of the swing arm 71. In such cases, such icicle-shaped obstructions will form more easily if the area of the arm member 71d in the ejection zone is greater, creating the risk of the swing arm 71 and the hook part 23d catching on each other, preventing the lock from being released even if a lock release command is issued.

Thus, the arm member 71d is largely hollowed out in the area from the imaginary symmetrical line to around the hook part 23d. In other words, an area 71d3 of the arm member 71d present in the ejection zone (i.e., the area, as seen from above, to the side in the direction of rotation into the restricting state with respect to the line connecting the rotational center of the hook part 23d and the rotational center of the swing arm 71 when positioned in the moving-away direction of the hook part 23d) is smaller than an area 71d2 of the arm member 71d present in the pass-through zone (i.e., the area, as seen from above, to the side in the direction of rotation into the non-restricting state with respect to the line connecting the rotational center of the hook part 23d and the rotational center of the swing arm 71 when the hook part 23d is positioned in the moving-away direction). This allows the overhanging part in the ejection zone to be reduced, impeding the formation of icicle-shaped obstructions or the like, and consequentially allowing for smooth movement of the swing arm 71 when releasing the lock. In particular, by cutting down just to the area overlapping the hook part 23d as viewed from above, it is possible to further reduce the possibility of obstructions or the like forming while reliably restricting movement in the moving-away direction of the hook part 23d.

The maximum external diameter section 71f of the swing arm 71 is symmetrically formed with respect to the axis O1 as viewed from above. This is because, assuming a scenario in which sufficient rotation of the swing arm 71 due to the operation of the lock actuator 73 is impossible due to failure or the like, ensuring the length of the maximum external diameter section 71f will make it possible to more reliably position the swing arm 71 in the moving-away direction of the hook part 23d.

Figure 8:
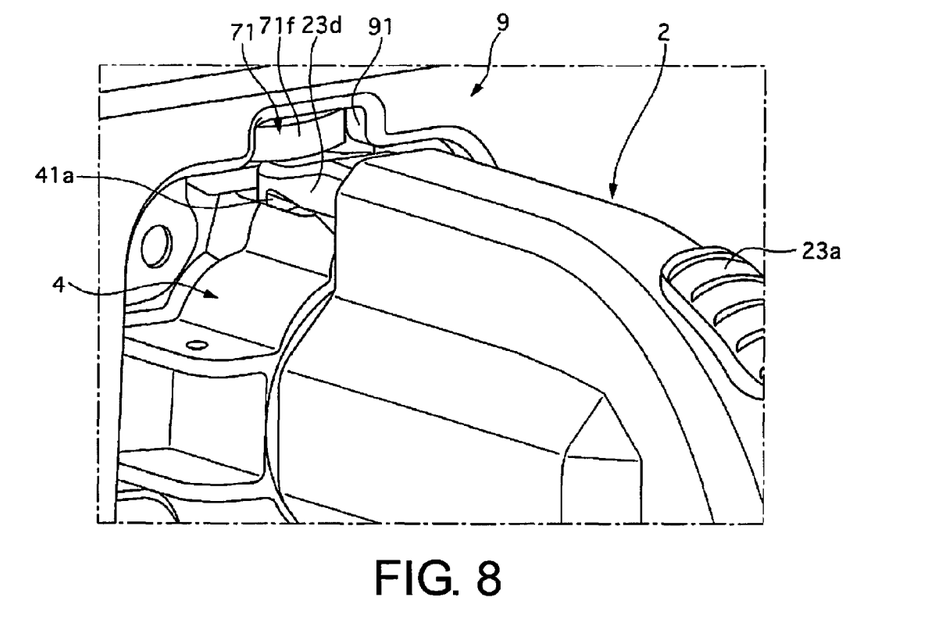
FIG. 8 is a perspective view of the charging connector and the charging port according to the first embodiment in a connected state.

FIG. 8 is a perspective view of the charging connector and the charging port according to the first embodiment in a connected state. Inserting the charging connector 2 in to the charging port 4 and operating the locking mechanism 7 to position the swing arm 71 in the moving-away direction of the hook part 23d prevents movement of the hook part 23d in the moving-away direction even if the release button 23a is pressed. This makes it impossible to release the engagement of the raised part 41a and the hook part 23d, preventing the removal of the charging connector 2. A cover member 9 for protecting against the intrusion of foreign matter into the locking mechanism 7 and the like at this time is provided on the charging port 4 of the vehicle. The cover member 9 covers the side of the locking mechanism 7 facing the plugging/unplugging direction of the charging connector 2, and comprises an opening 91 that allows for the insertion of the hook part 23d and partially exposes the swing arm 71.

Let us assume that a user has inserted the charging connector 2 into the charging port 4, operated the locking mechanism 7, and left the area, thereby starting charging. At this time, the maximum external diameter section 71f of the swing arm 71 is exposed, as shown in FIG. 8. If there were a large gap between the cover member 9 and the maximum external diameter section 71f, a finger or the like could be inserted into the gap to forcibly pry the swing arm 71 open. Thus, the gap between the swing arm 71 and the cover member 9 is narrowed to an extent that the two still do not touch.

When in a state in which removal of the charging connector 2 is restricted by the locking mechanism 7, the entirety of the opening 91 is closed off by the maximum external diameter section 71f of the swing arm 71. In other words, the rotational direction length of the maximum external diameter section 71f is greater than the width of the opening 91 (in the rotational direction). This is to eliminate the possibility of a finger or the like being inserted into a gap between an end of the opening 91 and an end of the swing arm 71 to forcibly pry open the swing arm 71.

Returning to FIG. 6, the relationship between the cover member 9 and the swing arm 71 will now be described in detail. As shown in FIG. 6, the clearance between the inner circumferential surface of the cover member 9 and the path of the maximum external diameter section 71f when the swing arm 71 rotates is set so as to progressively increase as the distance from the opening 91 increases. If the charging connector 2 is connected to the charging port 4 when there is foreign matter (such as gum, mud, dust, etc.) adhering to the hook part 23d, the rotation of the swing arm 71 will wipe ("sweep") off the foreign matter when it moves. If the clearance between the inner circumferential surface of the cover member 9 and the path of the maximum external diameter section 71f were set so as to progressively decrease, there would be a risk of the wiped-off foreign matter becoming wedged into the clearance, leading to high resistance and inhibiting the movement of the swing arm 71. Thus, the clearance between the inner circumferential surface of the cover member 9 and the path of the maximum external diameter section 71f is set so as to progressively increase as the distance from the opening 91 increases, allowing the wiped-off foreign matter to drop off and avoiding clogs.

Figure 9:
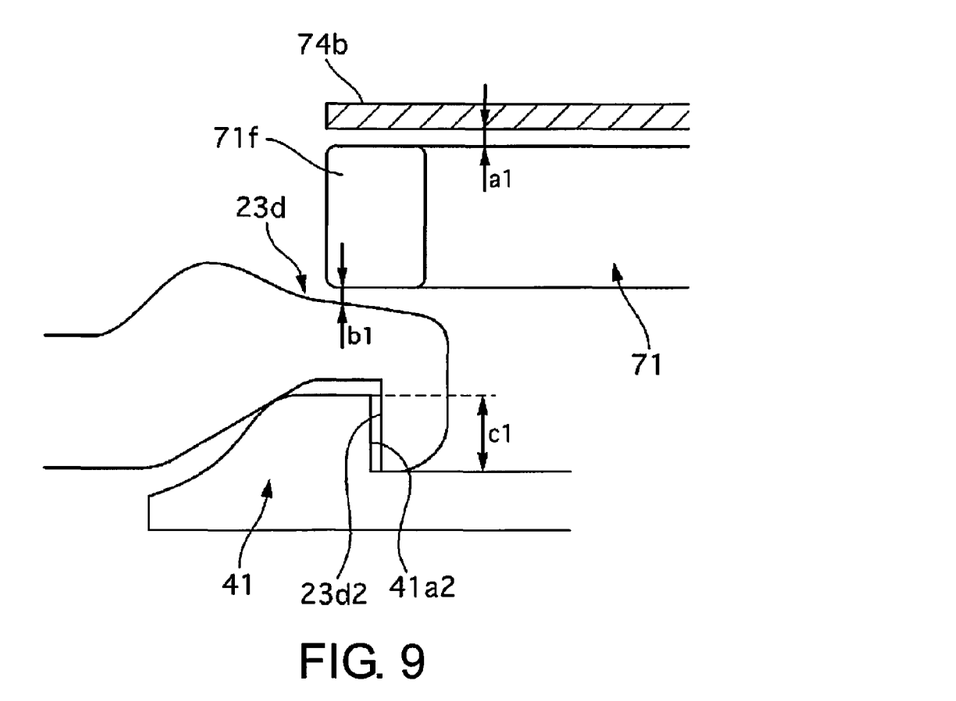
FIG. 9 is a schematic cross-sectional view of the relative positions of an active-engagement member and the swing arm according to the first embodiment.

FIG. 9 is a schematic cross-sectional view of the relative positions of an active-engagement member and the swing arm according to the first embodiment. There is a predetermined gap $a_1$ between the upper surface of the swing arm 71 and the support extension 74b, and a predetermined gap $b_1$ is present between the underside of the swing arm 71 and the hook part 23d. As a result, there is no contact between the support extension 74b and the hook part 23d when the swing arm 71 rotates, allowing the swing arm 71 to move smoothly. Taking $c_1$ as the height of the zone in which the stepped section 23d2 and the engaging surface 41a2 overlap as viewed from the plugging/unplugging direction of the charging connector 2, the relationship $c_1 > (a_1 + b_1)$ obtains. Thus, even if the hook part 23d is forcibly lifted and the gaps $a_1$, $b_1$ are eliminated, as shown in FIG. 10, the engagement of the stepped section 23d2 and the engaging surface 41a2 is maintained.

Figure 10:
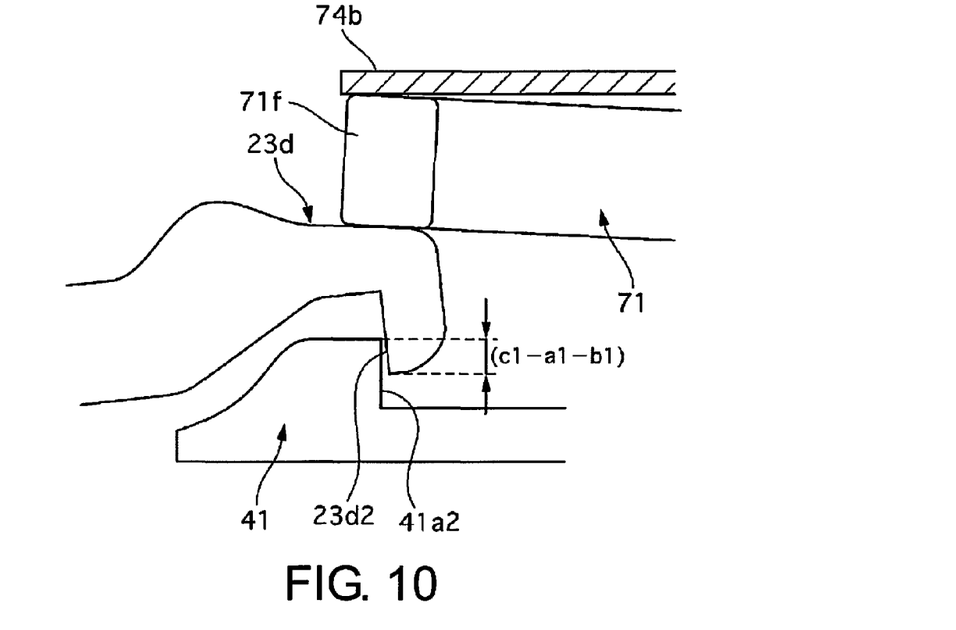
FIG. 10 is a schematic cross-sectional view of the relative positions of the active-engagement member and the swing arm according to the first embodiment when the active-engagement member is forcibly moved in a moving-away direction.

FIG. 10 is a schematic cross-sectional view of the relative positions of the active-engagement member and the swing arm according to the first embodiment when the active-engagement member is forcibly moved in a moving-away direction. If the release button 23a were pressed when the locking mechanism 7 is in operation and movement in the moving-away direction of the active-engagement member 23 is being restricted, the upper surface of the hook part 23d would contact the underside of the swing arm 71, lifting up the swing arm 71. Because the swing arm 71 itself is made of plastic, the rotary shaft section 735b of the lock actuator 73 is also not especially strong, meaning that the swing arm 71 is easily pushed upwards via deformation or skewing of the axis of rotation. However, the provision of the support extension 74b means that further deformation is prevented via contact with the support extension 74b. Moreover, because force is only applied in the through-thickness direction of the swing arm 71, sufficient strength against compressive forces can be ensured even if the plastic swing arm 71 is made of plastic. That is, the axis of rotation of the swing arm 71 is different from the plugging/unplugging direction of the charging connector 2 and different from the direction of the axis of rotation of the active-engagement member 23. Stated in still different terms, the direction of the axis of rotation of the swing arm 71 and the direction of the axis of rotation of the active-engagement member 23 are not parallel, and the interposition of the swing arm 71 in the moving-away direction of the hook part 23d has a restricting effect; in addition, a support extension 74b is provided. Thus, even if excessive force is applied by the hook part 23d, the force does not act in the rotational direction of the swing arm 71, allowing a sufficient restricting state to be maintained without the need for the swing arm 71 to be rigid with respect to the rotational direction or for the structure near the axis of rotation to be reinforced.

Figure 11:
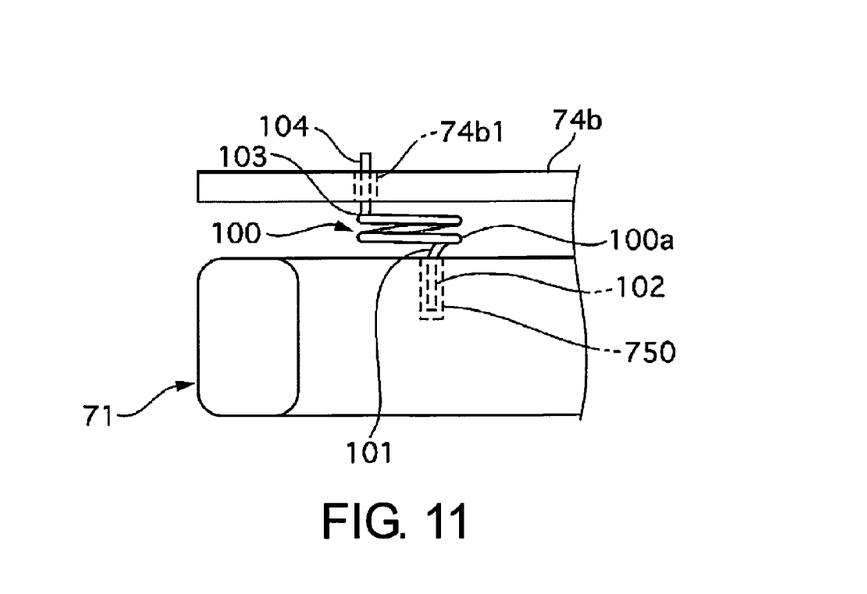
FIG. 11 is a schematic illustration of a part provided with a toggle spring according to the first embodiment.
Figure 12:
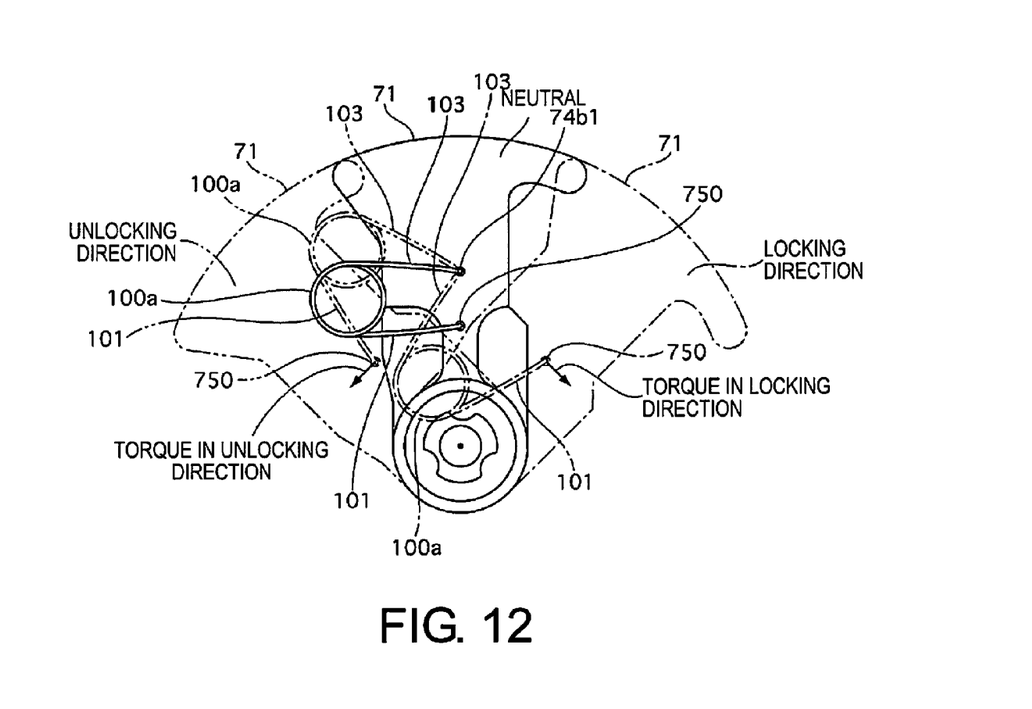
FIG. 12 is a schematic illustration of the mechanical operation of the toggle spring according to the first embodiment.
Figure 13:
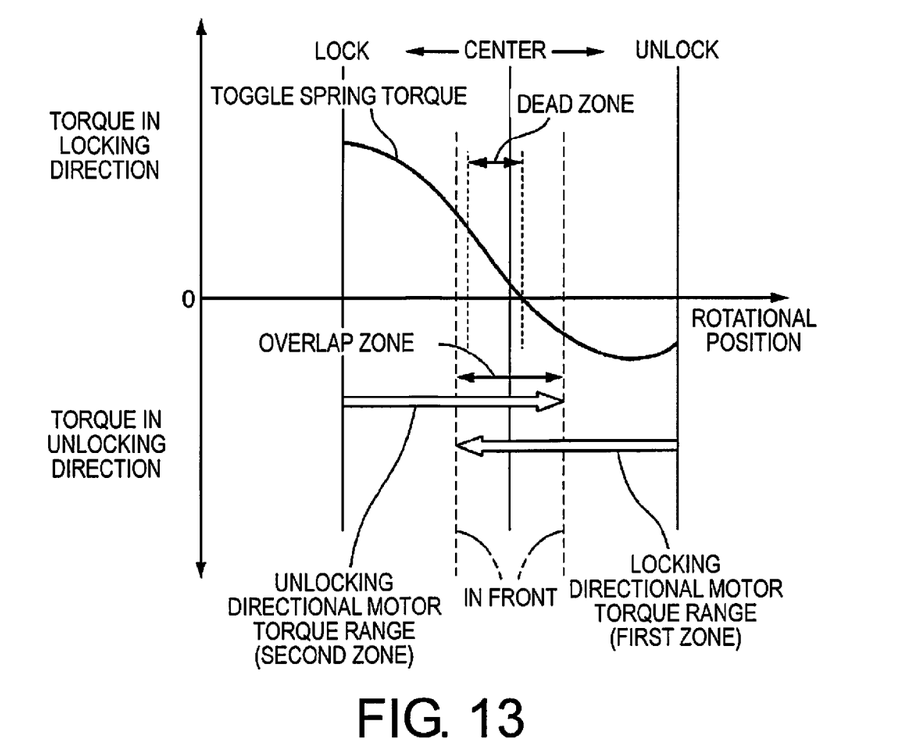
FIG. 13 is a graph of the relationship between the torque action range of the toggle spring and the motor and the relative position of the swing arm according to the first embodiment.

Next, the operation of the toggle spring will be described. FIG. 11 is a schematic illustration of a part provided with a toggle spring according to the first embodiment, FIG. 12 is a schematic illustration of the mechanical operation of the toggle spring according to the first embodiment, and FIG. 13 is a graph of the relationship between the torque action range of the toggle spring and the motor and the relative position of the swing arm according to the first embodiment. The horizontal axis represents the rotational position of the swing arm 71, as well as the position at which the locked state is entered (hereafter, the "lock position"), the position at which the unlocked state is entered (hereafter, the "unlock position"), and a central position therebetween. The vertical axis indicates the torque acting upon the swing arm 71. The upper half of the vertical axis represents toggle spring torque acting in the locking direction, and the lower half of the vertical axis represents toggle spring torque acting in the unlocking direction.

As shown in FIG. 11, the toggle spring 100 comprises an elastic force-generating coil section 100a, a swing arm-side foot section 101 that extends from the coil section 100a and engages with the swing arm 71, and an inserted section 102 that is bent in a direction roughly orthogonal to the swing arm side foot section 101 and is rotatably inserted into an engagement hole 750 formed in the swing arm 71. Similarly, the toggle spring 100 comprises a vehicle body-side foot section 103 that extends from the coil section 100a and engages with the support extension 74b, and an inserted section 104 that is bent in a direction roughly orthogonal to the vehicle body-side foot section 103 and is rotatably inserted into an engagement hole 74b1 formed in the support extension 74b.

The following is a description with reference to the top-down schematic view shown in FIG. 12. FIG. 11 is a schematic view from a lateral direction in which the swing arm 71 is at a neutral position, and FIG. 12 is a corresponding top-down illustration of the part at which the neutral position is located. At this time, the toggle spring 100 is in a bent state. In this state, the foot sections 101 and 103 of the toggle spring 100 spread outward, but the force thereof acts in a radial direction with respect to the rotational center of the swing arm 71, not in a rotational direction of the swing arm 71. When, in this state, the swing arm 71 is rotated by the motor 731 in the locking direction, the coil section 100a is displaced downward as seen in FIG. 12. As a result, the outward-spreading force of the foot sections 101 and 103 of the toggle spring 100 comprises a rotational component in the locking direction of the swing arm 71, and this torque biases the swing arm 71 toward the lock position. Similarly, when the swing arm 71 is rotated by the motor 731 in the unlocking direction, the coil section 100a is displaced upward as seen in FIG. 12. As a result, the outward-spreading force of the foot sections 101 and 103 of the toggle spring 100 comprises a rotational component in the unlocking direction of the swing arm 71, and this torque biases the swing arm 71 toward the unlock position.

In this way, it is apparent that the rotation of the swing arm 71 and the operation of the toggle spring 100 are related in a way such that the toggle spring 100 moves in a gap between the swing arm 71 and the support extension 74b. As friction is generated by this motion, a predetermined dead zone for the toggle spring 100 is formed in both directions centered upon the position (hereafter, the "spring center position") at which the inserted section 102 and the inserted section 104 align with the rotational center of the swing arm. In other words, if there is not a certain degree of rotation after the toggle spring 100 is in the spring center position, rotational direction torque capable of overcoming the friction cannot be generated.

The relationship between the action of the toggle spring described above and the operation of the motor will now be described in greater detail with reference to the graph of FIG. 13. As discussed in the context of the locking mechanism, the motor 731 operates the swing arm 71 to a position in front of the lock position or the unlock position. The range of motor torque outputted at this time is the range from the unlock position past the center to a predetermined lock zone (hereafter, the "first zone") for the zone in which torque acts in the locking direction, and from the lock position past the center to a predetermined unlock zone (hereafter, the "second zone") for the zone in which torque acts in the unlocking direction. Because the toggle spring 100 has a dead zone, the swing arm 71 cannot be moved by the force of the toggle spring if the motor 731 stops operating in this dead zone. Thus, it is imperative that, when operated, the motor 731 be driven so as to pass the dead zone of the toggle spring 100. In other words, the motor 731 is controlled so that the first zone and the second zone overlap. The dead zone of the toggle spring 100 is formed at a position overlapping this region of overlap. This allows the swing arm 71 to be moved to the toggle spring 100 by torque from the toggle spring 100.

In addition, the dead zone is set offset from the central position of the swing arm 71 to the locking side. In other words, the dead zone is formed at a position such that it overlaps more of the zone to the locking side of the neutral position than the zone to the unlocking side of the neutral position. A specific method of offsetting the dead zone will now be described. In the description of FIG. 12 above, the neutral position was described as a spring center position as which the inserted section 102 and the inserted section 104 align with the rotational center of the swing arm for the sake of convenience, but the dead zone can be offset by forming this spring center position slightly offset to the locking side. Offsetting the dead zone to the locking side in this way allows the unlocked state to be more reliably ensured.

The reasons for ensuring the unlocked state will now be described. As a rule, there is no vibrational input or the like that could affect the swing arm 71 when the vehicle is stopped; thus, when the vehicle is stopped, as during charging, there is no difficulty in maintaining the locked state. By contrast, because there is vibrational input and the like when the vehicle is traveling, there is a risk of the swing arm 71 moving to the locked state despite being in the unlocked state if there is vibrational input of the resonant frequency of the swing arm 71. If this happens, when the driver stops the vehicle at a charging station in order to charge the vehicle, the driver will not be able to insert the charging connector 2 due to the swing arm 71 being in the locked state. This will seem odd to the driver, since the driver does not especially operate the locking mechanism. Thus, the driver is kept from being subjected to such a situation by reliably ensuring the unlocked state even when there is vibrational input or the like when traveling.

Swing Arm Initial Position Adjustment Process

Next, a process of adjusting the initial position of the swing arm 71 will be described. For the sake of ensuring durability, as described above, when the swing arm 71 is driven, enough torque is applied to move the swing arm 71 to a suitable position in front of the locked state or the unlocked state, after which the arm is actuated by the elastic force of the toggle spring 100. However, a situation is conceivable in which lodged foreign matter or the like prevents the swing arm 71 from being actuated by the force of the toggle spring even if torque is applied until the arm reaches the position in front of the locked or unlocked state. In addition, even if steps are taken to ensure the unlocked state, unexpected vibrational input or the like while traveling may cause the arm to shift slightly from the unlock position in the locking direction. This will also impede the insertion of the charging connector 2.

For example, consider a case in which the swing arm 71 is positioned beyond the unlocking directional motor torque range and in front of the unlock position as seen in the graph shown in FIG. 13, preventing the force of the toggle spring from acting sufficiently. In such a case, even if one attempts to move the swing arm 71 in the unlocked state, motor torque cannot be imparted and the position of the arm cannot be changed, making it impossible to insert the charging connector 2.

Thus, in the first embodiment, an initial position adjustment process is performed in which, before the hook part 23d and the raised part 41a engage, torque is first applied in the locking direction, then again in the unlocking direction in a continuous action, eliminating the effects of unexpected shifts in position or debris and achieving the unlocked state.

Figure 14:
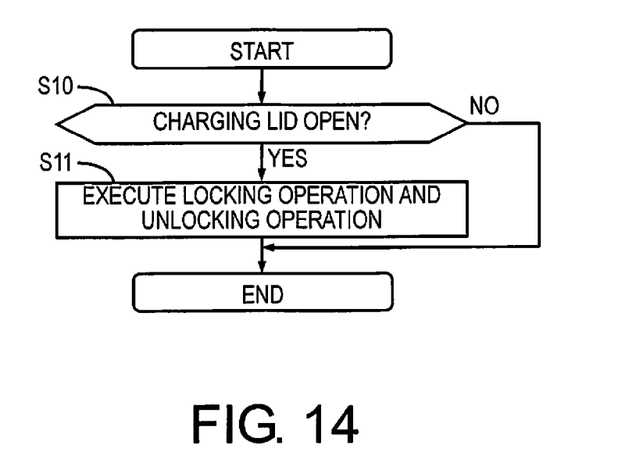
FIG. 14 is a flow chart of a process of adjusting the initial position of a locking mechanism according to the first embodiment.

FIG. 14 is a flow chart of a process of adjusting the initial position of a locking mechanism according to the first embodiment. This control process is performed by a controller not shown in the drawings, and a control signal is outputted to the locking mechanism 7.

In step S10, it is determined whether a command to open the charging lid 32 has been outputted. If so, it is likely that the charging connector 2 will be connected to the charging port 4 and the hook part 23d and the raised part 41a engaged; thus, before such engagement, the process continues to step S11 and executes a locking operation and an unlocking operation in order to adjust the initial position of the swing arm 71. On the other hand, if an open command has not been outputted and the charging connector 2 is not expected to be connected, that is, if the hook part 23d and the raised part 41a will not be engaging, the control process is ended.

As a result, even if the swing arm 71 is positioned beyond the unlocking directional motor torque range and in front of the unlock position, impeding the insertion of the charging connector 2, the initial generation of torque in the locking direction allows refuse or the like to be removed and the state of the toggle spring 100 to be reset. In addition, the subsequent application of torque in the unlocking direction allows the swing arm 71 to be returned to an initial position suitable for the unlock position.

As described above, the first embodiment yields the following effects.

(1) Provided are: a charging port 4, comprising a raised part 41a (passive-engagement part) that engages with a hook part 23d (engaging part) of a charging connector 2 as the result of an operation performed by a user, for supplying power from an external power source when in an engaged state; a locking mechanism 7 that, when the hook part 23d and the raised part 41a are in the engaged state, yields a locked state in which release of the engaged state is restricted by moving a swing arm 71 (restricting member) in a locking direction so as to prohibit an operation of releasing the hook part 23d, and attains an unlocked state in which such release is permitted by moving the swing arm 71 in an unlocking direction that is the opposite of the locking direction; a controller (lock state control means) that, when the swing arm 71 is being moved to a predetermined position for yielding the locked state or the unlocked state, energizingly drives the swing arm 71 using the motor 731 so that the swing arm 71 moves to a position in front of the predetermined position; and a step S11 (initial position adjustment means) that, before the hook part 23d and the raised part 41a engage, moves the swing arm 71 in the locking direction, then in the unlocking direction.

As a result, the swing arm 71 is not operated over its entire range of actuation by the motor 731, making it possible to keep excessive loads from acting upon the restricting means and improve durability. In addition, the swing arm 71 can be returned to an initial position suitable for an unlocked position.

(2) A toggle spring 100 is provided between the swing arm 71 and the vehicle body, and the swing arm is moved to the predetermined position from the position in front thereof by the elastic force of the toggle spring 100.

As a result, the swing arm 71 is not operated over its entire range of actuation by the motor, making it possible to keep excessive loads from being placed upon the swing arm 71 by the motor or the like and improve durability. In addition, because the swing arm is moved by the toggle spring 100, a force biasing the arm towards the predetermined position can be applied, allowing the predetermined position to be stably maintained.

(3) The locking mechanism 7 controls the motor 731 so that a first zone in which torque from the motor 731 is applied when the swing arm 71 is being actuated to the locked state and a second zone in which torque from the motor 731 is applied when the swing arm 71 is being actuated to the unlocked state overlap, and a dead zone in which the swing arm 71 is not operated by the spring force of the toggle spring 100 is formed at a position overlapping the overlapping zones.

This allows the swing arm 71 to be moved to locking or unlocking position by torque from the toggle spring 100.

(4) The dead zone is formed at a position such that it overlaps more of the zone to the locked state side of the neutral position than the zone to the unlocked state side of the neutral position.

As a result, it is possible to reliably ensure the unlocked state even when there is vibrational input or the like when traveling, keeping the driver from being subjected to unnatural situations.

(5) The restricting member is a swing arm that switches between the locked state and the unlocked state by rotating. This allows the restricting state to be sufficiently maintained by means of a simple arrangement. In addition, existing parts used for automatic door locking mechanisms and the like can be repurposed without modification, allowing manufacturing costs to be reduced.

The foregoing has been a description of various embodiments of the invention according to the present application, but other configurations are also acceptable. The first embodiment features an example in which the charging port is provided on the front of the vehicle, but the port may also be provided on the rear or a side of the vehicle. In addition, while the description of the embodiments features an electric vehicle, a plug-in hybrid vehicle is also acceptable.

The first embodiment features an example in which a coil spring is used as the toggle spring, but other arrangements may be acceptably applied as long as similar effects are yielded. For example, biasing force may be applied using a see-saw toggle switch. In addition, the first and second embodiments feature examples in which the locking mechanism switches between a restricting state and an unrestricting state by rotating, but an arrangement involving sliding forward and backward or left and right rather than rotating is also acceptable.

In the first embodiment, the command to open the charging lid 32 serves as the trigger to commence adjusting the initial position of the swing arm 71, but another signal may also be used as the trigger to commence adjusting the initial position of the swing arm 71. For example, adjustment of the initial position may be begun when a charging mode selection switch operable by a driver is operated, or when it is detected that the vehicle is in an area in which charging is wirelessly performed by the charging station facilities. In other words, any arrangement in which adjustment of the initial position is begun prior to the hook part 23d and the raised part 41a engaging is acceptable.

The invention claimed is:

1. An electric vehicle charging port control device comprising:
   a charging port comprising a passive-engagement part configured to engage an active-engagement part of a charging connector as the result of an operation performed by a user, the charging port configured to supply power from an external power source when in an engaged state;
   a locking mechanism that, when the active-engagement part and the passive-engagement part are in the engaged state, is configured to yield a locked state between the active-engagement part and the passive-engagement part and restrict disengagement by a restricting member moving in a locking direction, thereby preventing release of the active-engagement part, and to yield an unlocked state between the active-engagement part and the passive-engagement part in which release is permitted by the restricting member moving in an unlocking direction opposite the locking direction;
   at least one controller configured to energizingly drive the restricting member using a motor so that the restricting member moves to a position in front of a predetermined position when the restricting member is being moved to the predetermined position;
   a toggle spring disposed between the restricting member and a vehicle body;
   the restricting member being biased towards the predetermined position, from the position in front of the predetermined position, by an elastic force of the toggle spring after being energizingly driven to the position in front of the predetermined position by the motor when the restricting member is being moved to the predetermined position; and
   the at least one controller being further configured to move the restricting member in the locking direction, then in the unlocking direction, before the active-engagement part and the passive-engagement part engage.

2. The electric vehicle charging port control device according to claim 1, wherein
   the lock state control device is configured to control the motor so that a first zone in which torque from the motor acts when the restricting member is being operated to the locked state and a second zone in which torque from the motor acts when the restricting member is being operated to the unlocked state overlap to form a zone of overlap, and a dead zone in which the restricting member is not operated by the elastic force of the toggle spring is formed at a position overlapping the zone of overlap.

3. The electric vehicle charging port control device according to claim 2, wherein
   the dead zone is formed at a position overlapping more of a zone to a locked state side of a neutral position of the restricting member than a zone to an unlocked state side of the neutral position.

4. The electric vehicle charging port control device according to claim 1, wherein
   the restricting member is a swing arm configured to switch between the locked state and the unlocked state by rotating.

5. The electric vehicle charging port control device according to claim 1, wherein
   the restricting member is a swing arm configured to switch between the locked state and the unlocked state by rotating.

6. The electric vehicle charging port control device according to claim 2, wherein
   the restricting member is a swing arm configured to switch between the locked state and the unlocked state by rotating.

* * * * *